United States Patent [19]
Hashimoto et al.

[11] Patent Number: 5,010,862
[45] Date of Patent: Apr. 30, 1991

[54] METHOD FOR CONTROLLING THE QUANTITY OF INTAKE AIR SUPPLIED TO AN INTERNAL COMBUSTION ENGINE

[75] Inventors: Toru Hashimoto; Hitoshi Kamura, both of Kyoto; Katutoshi Yoshida, Anjo; Takeshi Jimbo; Tokushige Inuzuka, both of Okazaki, all of Japan

[73] Assignee: Mitsubishi Jidosha Kogyo Kabushiki Kaisha, Tokyo, Japan

[21] Appl. No.: 482,527

[22] Filed: Feb. 21, 1990

[30] Foreign Application Priority Data

Feb. 28, 1989 [JP] Japan .................................. 1-48270

[51] Int. Cl.$^5$ .............................................. F02D 41/16
[52] U.S. Cl. .................................... 123/339; 123/585
[58] Field of Search ................ 123/339, 585, 361, 399

[56] References Cited

U.S. PATENT DOCUMENTS

4,425,886  1/1984  Kuroiwa et al. ...................... 123/339
4,691,675  9/1987  Iwaki .................................... 123/339
4,716,871  1/1988  Sakamoto et al. ................... 123/339
4,742,807  5/1988  Sakamoto et al. ................... 123/339

Primary Examiner—Tony M. Argenbright
Attorney, Agent, or Firm—Abelman, Frayne, Rezac & Schwab

[57] ABSTRACT

Disclosed is a method for controlling the quantity of intake air supplied to an internal combustion engine, in which the position of a valve member of a flow control valve having a non-linear valve opening characteristic is converted into an intake air quantity or a virtual valve position proportional to the intake air quantity so as to linearize the non-linear valve opening characteristic of the flow control valve. Application of the method of the present invention to an idle speed control device in an engine equipped with an electronic controlled fuel injection system is advantageous in that the quantity of intake air supplied to the engine can be accurately controlled under various operating conditions of the engine, thereby preventing rotation of the engine at an excessively high speed and stalling of the engine, improving the fuel consumption and reducing noise generated from the engine.

8 Claims, 11 Drawing Sheets

$P_{BASE}$-COOLING WATER TEMP MAP

WATER TEMP (WT)

FIG.7

VALVE OPENING CHARACTERISTIC MAP

FIG.8

INTAKE AIR QUANTITY-ENGINE
ROTATION SPEED MAP

FIG. 10

INVERSE CONVERSION MAP

FIG.11

VALVE POSITION-ENGINE ROTATION SPEED MAP

METHOD FOR CONTROLLING THE QUANTITY OF INTAKE AIR SUPPLIED TO AN INTERNAL COMBUSTION ENGINE

BACKGROUND OF THE INVENTION

1. Field of the Invention

This invention relates to a method for controlling the quantity of intake air supplied to an internal combustion engine, and more particularly to a method of the kind described above by which a fuel-air mixture having a proper mixture ratio can be continuously supplied to the combustion chambers of the engine under whatever operating condition of the engine.

2. Description of the Prior Art

An internal combustion engine equipped with an electronic controlled fuel ignition system (abbreviated hereinafter as an ECI) is commonly provided with an idle speed control device (abbreviated hereinafter as an ISC) as a means for controlling an idling rotation speed of the engine. The ISC acts to electrically control the quantity of a fuel-air mixture supplied to the combustion chambers of the engine independently of the amount of depression of the accelerator pedal, so that the idling rotation speed of the engine can be maintained at an appropriate level. The ISC is broadly classified into two types, that is, a direct actuation type and a bypass type. In the ISC of the direct actuation type, a throttle valve is directly actuated by an actuator. On the other hand, in the ISC of the bypass type, a bypass passage is provided in parallel to an intake pipe, and the sectional area of the bypass passage is increased or decreased by an associated valve member.

Figure 3:
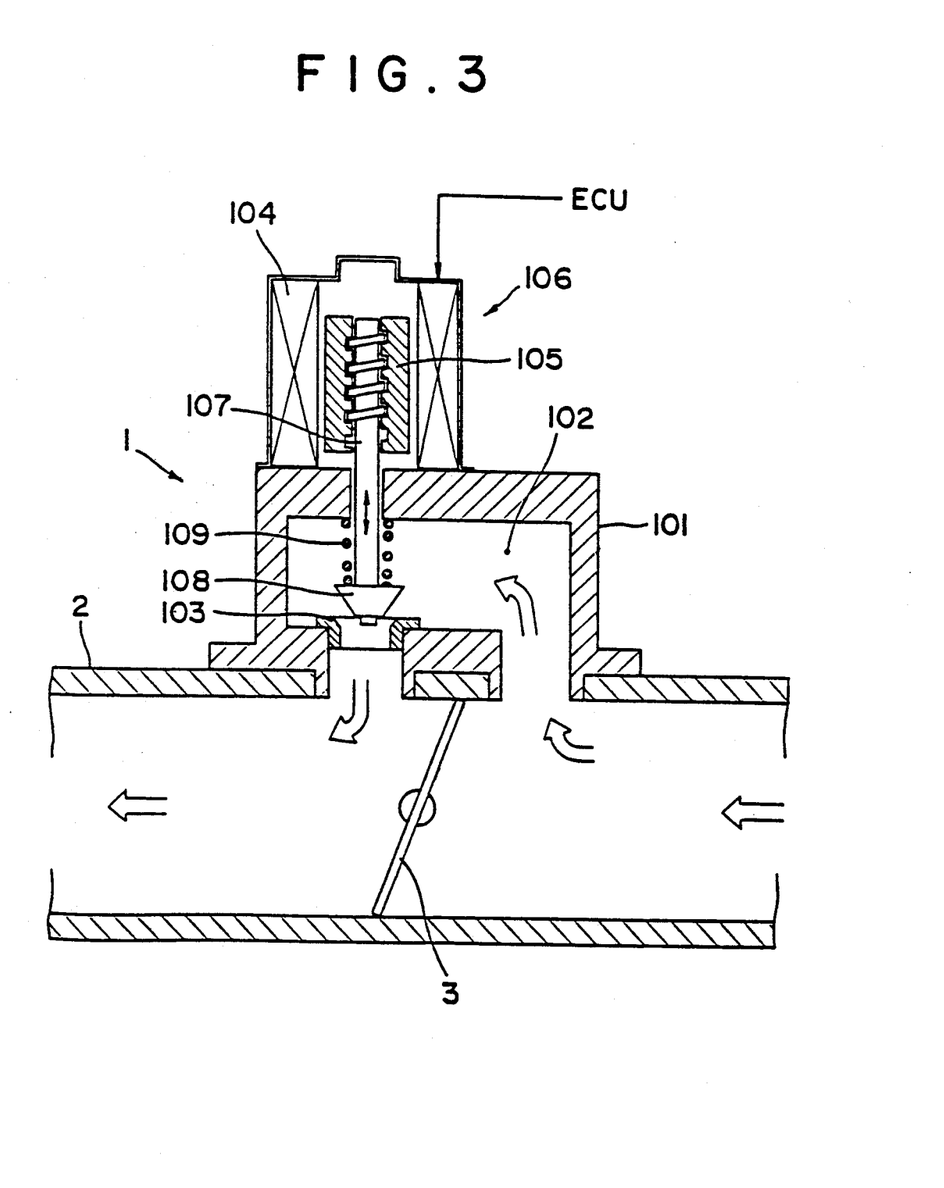
FIG. 3 is a sectional view of an idle speed control valve mounted on the intake pipe of the engine shown in FIG. 1.

FIG. 3 shows one form of the ISC of the bypass type. Referring to FIG. 3, an ISC valve 1 acting as a flow control valve is directly mounted on one side of an intake pipe 2. In a valve body 101 of this ISC valve 1, an intake air bypass passage 102 communicating with both an upstream side and a downstream side of a throttle valve 3 in the intake pipe 2 is formed, and a valve seat 103 is press-fitted in a part of the valve body 101 defining the downstream end of the intake air bypass passage 102.

A stepping motor 106 consisting of a stator 104 and a rotor 105 is mounted on the top of the valve body 101, and a valve shaft 107 is coupled at its upper end to the stepping motor 106 through a feed screw mechanism in the form of a screw threaded spline connection. A valve member 108 is formed on the lower end of the valve shaft 107. This valve member 108 is located opposite to the valve seat 103 and makes vertical movement relative to the valve seat 103 thereby increasing and decreasing the sectional area of the intake air bypass passage 102. A coil spring 109 is mounted on the valve shaft 107 so as to eliminate backlash of the feed screw mechanism.

The operation of the ISC valve 1 is controlled by an electronic control unit (abbreviated hereinafter as an ECU) (not shown) in a manner which will be briefly described below.

As compared to idling under a no-loaded condition of the engine, it is necessary to supply the fuel-air mixture of a larger quantity to the combustion chambers of the engine to drive an auxiliary equipment such as a coolant compressor of an air conditioner, an alternator or an oil pump of a power steering mechanism, in order to maintain the same rotation speed of the engine. Also, in the case of fast idling for the purpose of warming up the engine, the fuel-air mixture in a quantity sufficient for maintaining the high rotation speed is required.

The ECU determines the idling rotation speed of the engine on the basis of various operation parameters. For example, on the basis of an output signal of a crank angle sensor, the ECU applies a control signal to the ISC valve 1 for controlling feedback of the engine rotation speed (abbreviated hereinafter as N-feedback) so as to maintain the idling rotation speed. However, the N-feedback described above cannot sufficiently deal with a sharp increase or decrease in the load due to starting or stopping the operation of an auxiliary equipment of the kind described above, and delayed control results in undesirable stalling of the engine or blow-up. Therefore, in such a case, valve position feedback control (abbreviated hereinafter as P-feedback) is carried out in which the opening of the ISC valve 1 is determined on the basis of the factors including the amount of the load, and the ISC valve 1 is controlled to be set at the determined valve opening. This P-feedback mode is the so-called predictive control mode and shifts to the N-feedback mode as soon as the engine starts to operate in its steady operation state.

In each of the N-feedback mode and the P-feedback mode, the ECU supplies a pulse current to the stepping motor 106 after determination of the engine rotation speed to be controlled. In response to the supplied pulse current, the rotor 105 of the stepping motor 106 rotates through a predetermined number of steps to cause vertical movement of the valve shaft 107 thereby changing the position of the valve member 108 relative to the valve seat 103. As a result, a change occurs the quantity of intake air flowing from the upstream side toward the downstream side of the throttle valve 3 while flowing through the bypass passage 102 in the ISC valve 1.

In the air intake system described above, air instead of a fuel-air mixture flows through the bypass passage 102 in the ISC valve 1. That is, the above description refers to a multipoint injection system in which a plurality of injectors are disposed on the downstream side of the throttle valve 3. However, in the case of a single-point injection system where a single injector is disposed on the upstream side of the throttle valve 3, a fuel-air mixture instead of air flows through the bypass passage 102 in the ISC valve 1.

The valve opening of the ISC valve 1 is determined depending on the position of the valve shaft 107 relative to the valve seat 103. In the case of the P-feedback mode, the position of the valve shaft 107 is controlled on the basis of the number of driving steps (abbreviated hereinafter as steps) of the stepping motor 106 from the full closed position of the ISC valve 1. Suppose, for example, that the engine is idling under a no-loaded condition after being warmed up (referred to hereinafter as hot idling), and the valve opening under the hot idling condition (referred to hereinafter as hot-idling basic opening) corresponds to 9 steps. When, for example, the air conditioner or the alternator is driven during the hot idling condition of the engine, the corresponding valve opening (referred to hereinafter as load-dependent opening) must be increased by 5 steps from the number of steps in the hot-idling basic opening. Also, when the power steering mechanism is additionally actuated, the load-dependent opening must be increased by 10 steps. Further, the valve opening under a fast idling condition (referred to hereinafter as fast-idling basic opening) is as large as a number of, for example, 50 steps. Thus, depending on the load imposed on the engine rotating under the hot idling condition, the valve opening is compensated or increased in the manner described above. That is, the valve opening is determined to meet the load imposed on the engine.

Figure 7:
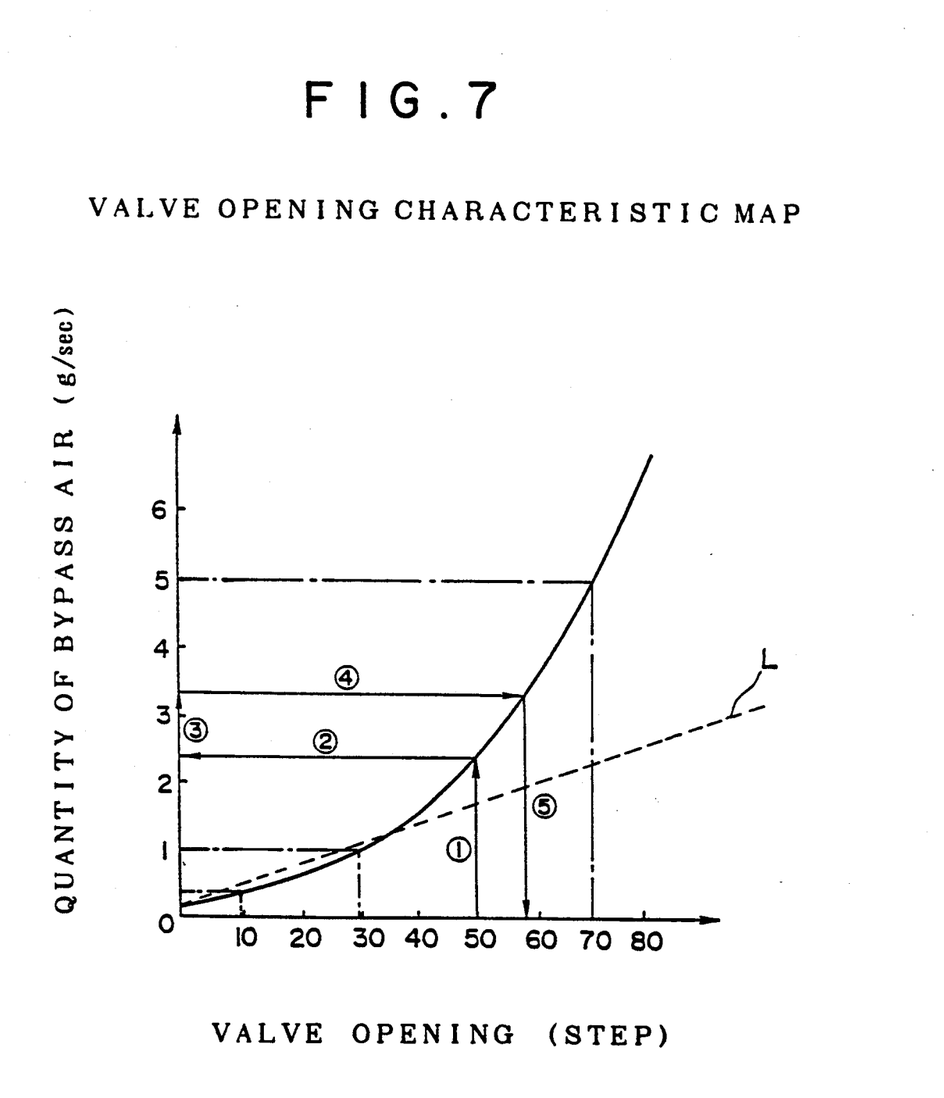
FIG. 7 shows a map representing the valve opening characteristic of the flow control valve.

FIG. 7 is a map representing the relation between the number of steps required for opening the ISC valve 1 from the full closed position and the corresponding quantity of air flowing through the bypass passage 102 in the ISC valve 1. It will be seen from this map that there is a progressive relation between then. The reason why the ISC valve 1 has such a non-linear opening characteristic will now be described.

When the engine is operating in the hot idling condition, it is necessary to delicately control the rotation speed of the engine so as to stabilize the rotation and to maintain satisfactorily low fuel consumption. For this purpose, it is necessary to minimize the change in the quantity of air supplied per step, that is, to minimize the gain. On the other hand, when, for example, the power steering mechanism is actuated, undesirable stalling of the engine due to an overload tends to occur unless the quantity of air supplied to the engine is sharply increased. Also, when the engine is to be started from its cold condition, the opening of the ISC valve 1 must be increased from the hot-idling opening to the fast-idling opening within a very short period of time so as to avoid trouble such as mal-starting or impossibility of starting. Therefore, the gain is progressively increased from that under the hot-idling condition toward that under the full open position of the ISC valve 1 to satisfy all of those requirements.

The valve opening of the ISC valve 1 in the P-feedback mode is controlled by controlling the number of steps of rotation of the rotor of the stepping motor 106. However, the prior art manner of valve opening control has had a problem which will be described below.

The aforementioned valve opening compensation under the loaded condition (referred to hereinafter as load-dependent compensation) is determined on the basis of the hot-idling basic opening.

It will be seen in FIG. 7 that the basic opening and the quantity of air supplied under the hot idling and no-loaded condition are 9 steps and 0.4 g/sec respectively. Then, when the handle is manipulated with the aid of the power steering mechanism while driving both the air conditioner and the alternator from the above condition, the opening of the ISC valve 1 is increased by 20 steps to be now set at the value corresponding to 29 steps, and the quantity of air is now set at 1 g/sec. That is, the quantity of air for the load-dependent compensation is incremented by 0.6 g/sec.

However, in the fast idling mode of the engine, the basic opening and the quantity of air supplied under the no-loaded condition are set at 50 steps and 2.3 g/sec respectively as shown in FIG. 7. Then, when the handle is manipulated while driving both the air conditioner and the alternator as in the above case, the opening of the ISC valve 1 is increased by 20 steps to be now set at 70 steps, and the quantity of air is now set at 5.0 g/sec.

Thus, in spite of the fact that the required increment of the quantity of air to attain the load-dependent compensation is 0.6 g/sec, the quantity of air is now incremented by 2.7 g/sec, and this means that the excess quantity of air as large as 2.1 g/sec is now supplied. This will result in such an undersirable situation that difficulty is encounted for maintaining the rotation speed of the engine at the required level.

SUMMARY OF THE INVENTION

With a view to solve the prior art problem pointed out above, it is an object of the present invention to provide a method for controlling the quantity of intake air supplied to an internal combustion engine so as to continuously supply a proper quantity of a fuel-air mixture to the combustion chambers of the engine, thereby reducing the fuel consumption as well as noise and preventing rotation of the engine at an excessively high speed.

In accordance with one aspect of the present invention which attains the above object, there is provided, in an internal combustion engine provided with a flow control valve which has a non-linear characteristic between the quantity of intake air flowing therethrough and the position of its valve member when the flow control valve is in its open position, a method for controlling the quantity of intake air supplied to the engine by actuating an actuator, the method comprising a first step of converting the position of the valve member of the flow control valve under a predetermined operating condition of the engine into a quantity of intake air determined according to the non-linear characteristic of the flow control valve; a second step of adding, to the quantity of intake air computed as a result of the conversion according to the non-linear characteristic, a pre-set intake air quantity change previously determined to deal with a change in the operating condition of the engine thereby computing an objective quantity of intake air; a third step of converting the objective quantity of intake air into an objective position of the valve member of the flow control valve according to the non-linear characteristic; and a fourth step of actuating the flow control valve by the actuator on the basis of a deviation of the real position of the valve member of the flow control valve from the objective position of the valve member of the flow control valve.

In accordance with another aspect of the present invention which attains the above object, there is provided, in an internal combustion engine provided with a flow control valve which has a non-linear characteristic between the quantity of intake air flowing therethrough and the position of its valve member when the flow control valve is in its open position, a method for controlling the quantity of intake air supplied to the engine by actuating an actuator, the method comprising: a first step of converting the position of the valve member of the flow control valve under a predetermined operating condition of the engine into a virtual valve position having a linear characteristic with respect to the quantity of intake air flowing through the flow control valve having the non-linear characteristic; a second step of adding, to the virtual position of the valve member of the flow control valve, a pre-set valve member displacement previously determined to deal with a change in the operating condition of the engine thereby computing a virtual objective position of the valve member of the flow control valve; a third step of inversely converting the virtual objective position of the valve member of the flow control valve having the non-linear characteristic into an objective position of the valve member of the flow control valve according to an inverse conversion map; and a fourth step of actuating the flow control valve by the actuator on the basis of a deviation of the real position of the valve member of the flow control valve from the objective position of the valve member of the flow control valve.

In the method of the present invention, the position of the valve member of the flow control valve having primarily a non-linear characteristics is linearized by converting it into a quantity of intake air or into a virtual position of the valve member proportional to the quantity of intake air, an increment or decrement corresponding to a change in the operating condition of the engine due to impartation of a load is added to the quantity of intake air or to the virtual position of the valve member, and a control map is then referenced so as to retrieve a require displacement of the valve member.

The method for controlling the quantity of intake air supplied to an internal combustion engine according to the present invention is advantageous in that the quantity of intake air supplied to the engine can be accurately controlled under any one of various operating conditions of the engine, thereby preventing rotation of the engine at an excessively high speed and stalling of the engine, improving the fuel consumption and reducing noise generated form the engine.

DETAILED DESCRIPTION OF THE PREFERRED EMBODIMENTS

Two embodiments of the present invention applied to an idle speed control (ISC) valve in a gasoline engine equipped with an electronic controlled fuel injection system (ECI) will now be described in detail with reference to the accompanying drawings.

The first embodiment refers to a case where the opening of the ISC valve, that is, the position of its valve member is converted into a quantity of intake air, and the second embodiment refers to a case where the position of the valve member of ISC valve is converted into a virtual valve position proportional to the quantity of intake air. In these two embodiments, the structure of hardware is the same, but software used for control is not entirely the same. Therefore, the hardware will be described in the first embodiment only, and the same part of the software will also be described in the first embodiment only.

First Embodiment

The hardware of a centralized engine control system including an ISC valve to which the first embodiment of the present invention is applied will now be briefly described with reference to FIGS. 1 and 2.

Figure 1:
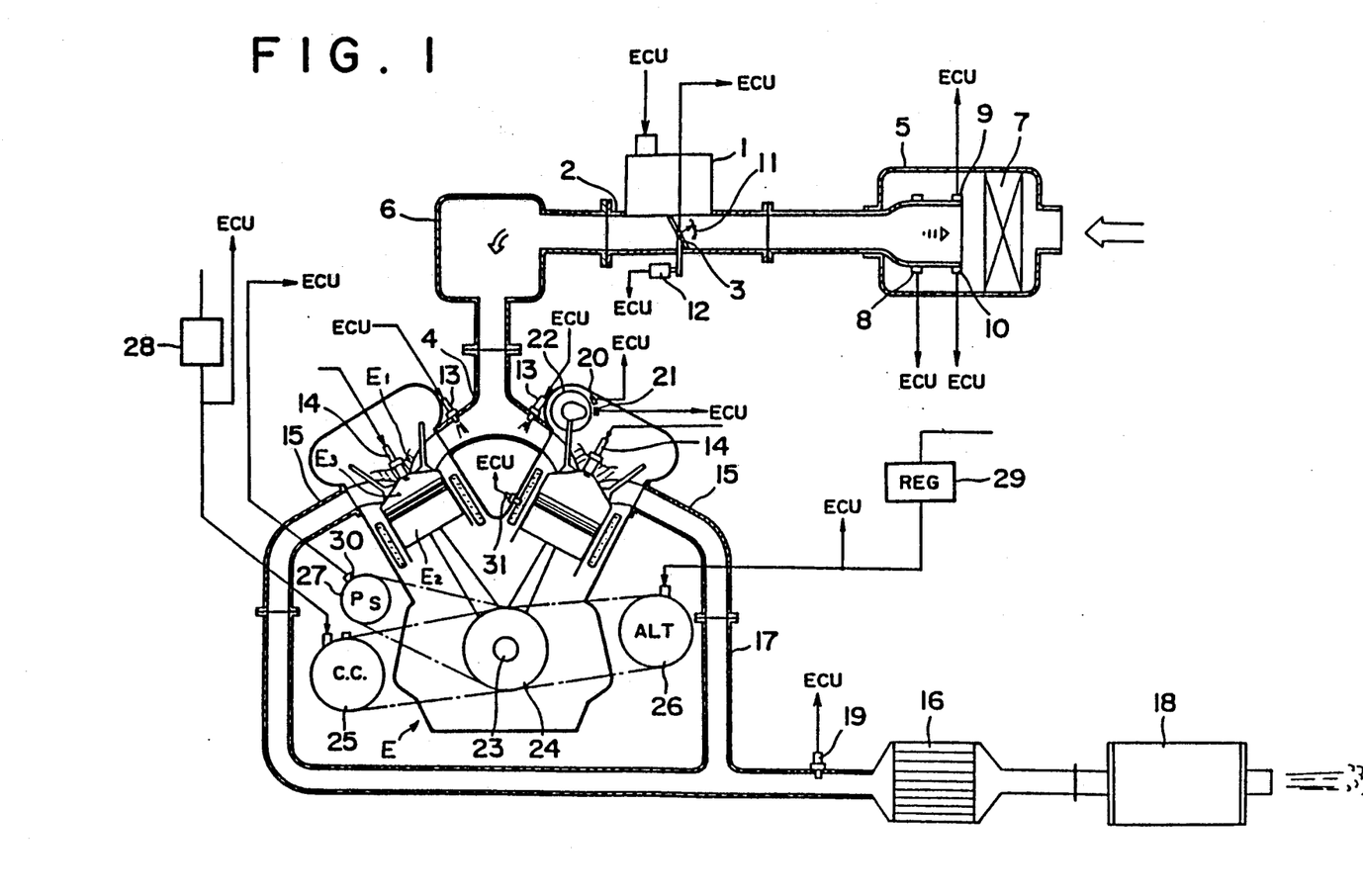
FIG. 1 is a diagrammatic view showing the general structure of a centralized engine control system to which a first and a second embodiment of the present invention are applied.
Figure 2:
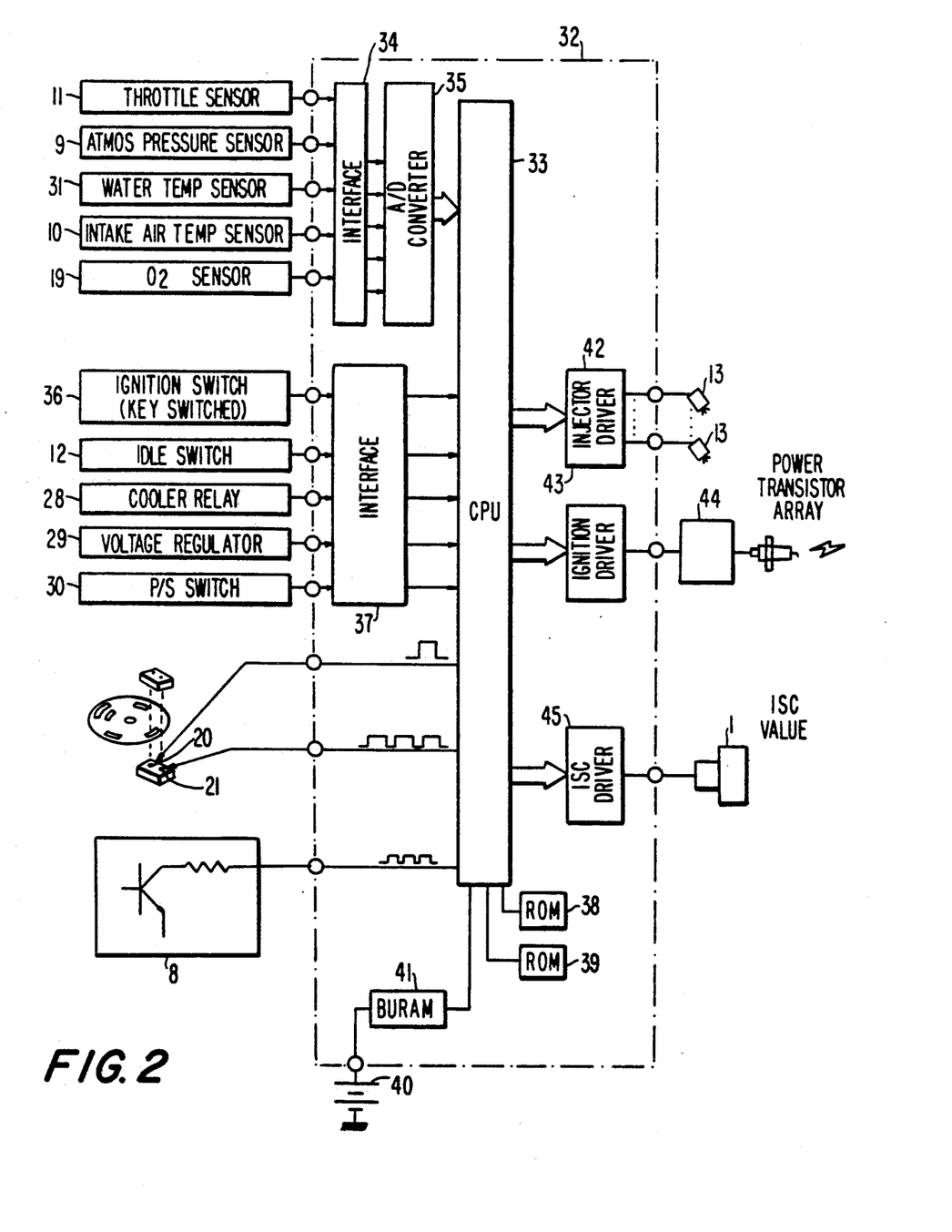
FIG. 2 shows a hardware structure of an electronic control unit.

Referring to FIG. 1, the symbol E designates V-type six-cylinder gasoline engine for an automotive vehicle, and the engine E is equipped with an ECI. An intake pipe 2 having an air cleaner box 5 located on the upstream side is connected through a serge chamber 6 to an intake manifold 4. An air cleaner 7 is housed in the air cleaner box 5 together with a karman vortex type air flow meter 8, an atmospheric pressure sensor 9 and an intake air temperature sensor 10. A throttle valve 3 actuated by a wire connected to an accelerator pedal (not shown) is disposed in the intake pipe 2, and an ISC valve 1 similar to that described in the description of the prior art is mounted on the intake pipe 2. A potentiometer type throttle sensor 11 and an idle switch 12 are associated with the throttle valve 3.

A plurality of or six injectors 13 equal to the number of cylinders of the engine E are disposed in the intake manifold 4, and six ignition plugs 14 are mounted on a cylinder head $E_1$ of the engine E. An exhaust pipe 17 provided with a catalytic converter 16 is connected at its front end to an exhaust manifold 15, and a muffler 18 is connected to the rear end of the exhaust pipe 18. An $O_2$ sensor 19 detects the concentration of oxygen contained in engine exhaust gases. A crank angle sensor 20 and a cylinder identification sensor 21 are mounted on a cam shaft 22.

A drive pulley 24 is integrally mounted on a crankshaft 23 which is an output shaft of the engine E. This drive pulley 24 drives, by V-belts, a coolant compressor 25 of an air conditioner, an alternator 26, and an oil pump 27 in a power steering mechanism.

The coolant compressor 25 includes a built-in magnetic clutch energized by a current supplied from a coolant relay 28 and thus provides a load on the engine E. The alternator 26 is energized to start to generate power in response to an exiting current supplied from a voltage regulator 29 (abbreviated hereinafter as a regulator). The oil pump 27 is driven in response to steering of a handle (not shown). Thus, the alternator 26 and the oil pump 27 provide respective loads on the engine E, in addition to the coolant compressor 25. A P/S switch 30 detects the operating oil pressure in the oil pump 27. A water temperature sensor 31 detects the temperature of engine cooling water.

The various kinds of sensors and the controlled components described above are electrically connected to an ECU 32 disposed in the compartment of the vehicle. Referring to FIG. 2 showing the hardware structure of the ECU 32, a central processing unit (CPU) 33 is a main component. Analog output signals form the atmospheric pressure sensor 9, intake air temperature sensor 10, throttle sensor 11, $O_2$ sensor 19 and cooling water temperature sensor 31 are applied as inputs to the CPU 33 through a first interface 34 and an A/D converter 35. Output signals form the idle switch 12, coolant relay 28, regulator 29, P/S switch 30 and ignition switch 36 are applied as inputs to the CPU 33 through a second interface 37. On the other hand, output signals form the air flow meter 8, crank angle sensor 20, and cylinder identification sensor 21 are directly applied as inputs to the CPU 33.

A read-only memory (ROM) 38, a random-access memory (RAM) 39 and a battery back-up RAM (referred to hereinafter as a BURAM) 41 are connected by bus lines to the CPU 33. The BURAM 41 continues to store its memory contents even when the ignition switch 36 is turned off.

On the basis of the input signals of various kinds described above, the CPU 33 caries out necessary computations so as to determine the quantity of fuel to be injected, the ignition timing and the opening of the ISC valve 1. The CPU 33 generates actuation signals so as to drive the injectors 13 through an injector driven 42, to drive the ignition plugs 14 through an ignition driven 43 and a power transistor array 44 and to drive the stepping motor 106 in the ISC valve 1 through an ISC driver 45.

Air drawn into the air intake system to flow through the air cleaner 7 due to the negative pressure induced due to the downward movement of pistons $E_2$ in the cylinders of the engine E is supplied to the air flow meter 8, atmosphenic pressure sensor 9 and intake air temperature sensor 10 which detect the quantity of intake air, the atmospheric pressure and the temperature of intake air respectively. Then, after the flow rate of intake air is adjusted by the throttle valve 3 in the intake pipe 2 and also by the ISC valve 1, the intake air flows past the surge chamber 6 into the intake manifold 4 where gasoline injected from the injectors 13 is mixed with the intake air to provide a fuel-air mixture. With the downward movement of the piston $E_2$ in each cylinder of the engine E, the fuel-air mixture flows into the combustion chamber $E_3$ and is ignited by the associated ignition plug 14 at about the top DEAD center of the compression stroke of the piston $E_2$.

As soon as the piston $E_2$ completes its explosion and compression strokes, exhaust gases produced as a result of combustion of the fuel-air mixture flow into the exhaust pipe 17 through the exhaust manifold 15. The exhaust gases flown into the exhaust pipe 17 are purified by the catalytic converter 16 and flow then through the muffler 18 to be exhausted to the atmosphere.

Figure 6:
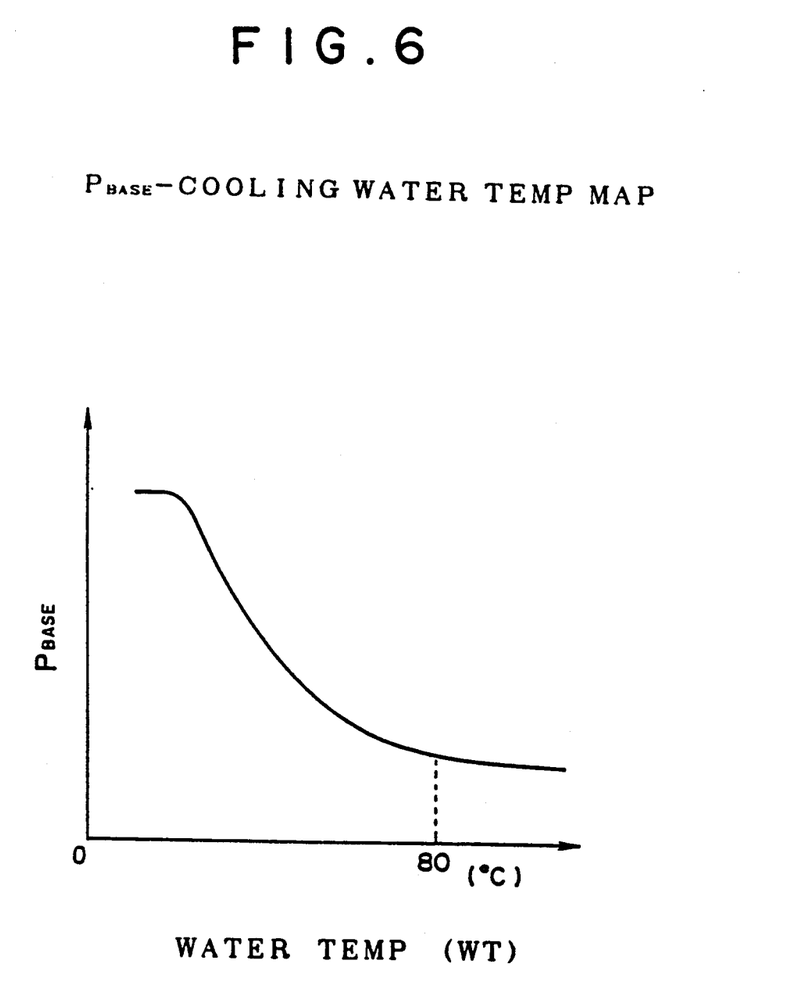
FIG. 6 shows a map representing the relation between the basic position $P_{BASE}$ of the valve member of the flow control valve and the temperature WT of engine cooling water.

The operation of the first embodiment of the method according to the present invention will now be described with reference to FIG. 4 which is a flow chart of control steps and FIGS. 6, 7 and 8 which show various control maps.

Figure 4:
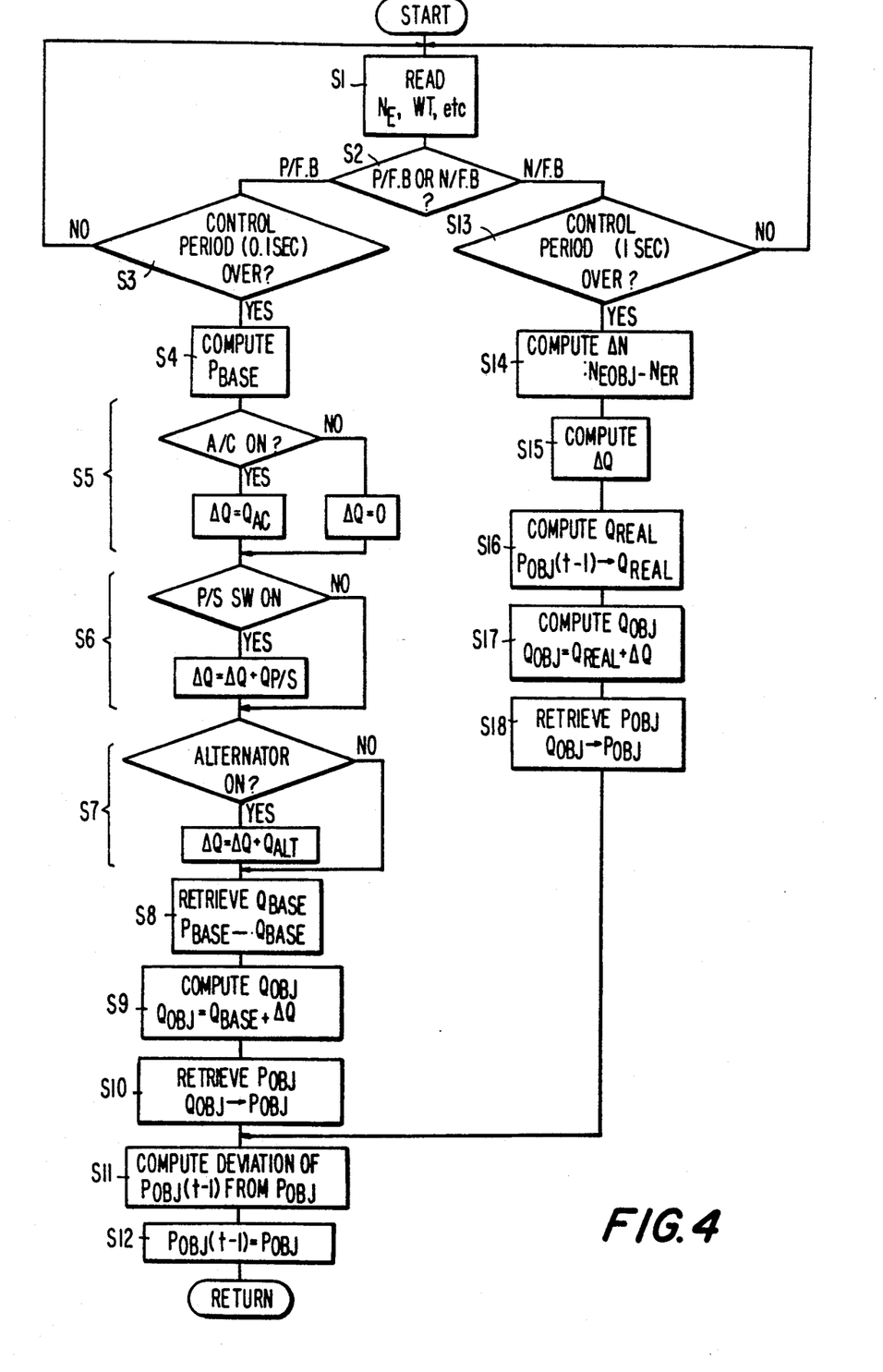
FIG. 4 is a flow chart of control steps according to the first embodiment of the present invention.

When the output signal from the idle switch 12 is applied to the CPU 33 after the engine E is started from its standstill state, the CPU 33 confirms the fact that the engine E is now idling and controls the ISC valve 1 according to the flow chart shown in FIG. 4.

Step S1

As soon as the ISC control is started, the CPU 33 reads various engine operation parameter information including the engine rotation speed information $N_E$ transmitted from the crank angle sensor 20 and the cooling water temperature information WT transmitted from the water temperature sensor 31.

Step S2

Then, on the basis of these engine operation parameter information, the CPU 33 decides as to whether the P-feedback mode or the N-feedback mode is to be selected for the ISC control. For the purpose of this decision, whether or not the engine E is in its hot idling condition and its operating condition is stabilized is detected from the transmitted engine operation parameter information. When the engine E is hot idling and its operating condition is stabilized, the N-feedback mode is selected, while, in any one of other cases, the P-feedback mode is selected. In the above manner of decision, the valve position instead of the engine rotation speed is primarily based to determine the fast idling condition of the engine. However, the above manner of decision does not apply to the case where the N-feedback mode is selected even when the engine E is in the fast idling condition.

Step S3

When the P-feedback mode is selected, the CPU 33 decides as to whether or not a period of control set by a time counter (not shown) has elapsed. In this first embodiment, the control period in the P-feedback mode is set at 0.1 sec. When the CPU 33 decides that the control period has not yet elapsed, the control program returns to the start point.

Step S4

When the CPU 33 decides that the control period has elapsed already, the CPU 33 then retrieves or reads the basic valve position $P_{BASE}$ of the ISC valve 1 from a map representing the relation between the basic valve position $P_{BASE}$ and the cooling water temperature WT and stored in the ROM 38. This map is shown in FIG. 6. The basic valve position $P_{BASE}$ changes depending on the cooling water temperature WT as shown in FIG. 6. This basic valve position $P_{BASE}$ corresponds to, for example, 9 steps of rotor rotation in the stepping motor 106 as in the conventional case. However, at temperatures lower than 80° C., this basic valve position $P_{BASE}$ is set at an opening corresponding to, for example, 10 to 50 steps suitable for fast idling, as shown in FIG. 6.

Step S5

After the basic valve position $P_{BASE}$ is set in the step S4, the CPU 33 confirms whether or not the cooler relay 28 generates its output signal, and, when the operation of the cooler relay 28 is confirmed, the CPU 33 sets a valve $\Delta Q$ (referred to hereinafter as an air quantity deviation) required for incrementing compensation of the quantity of bypass air to deal with the operation of the coolant compressor 25. This air quantity deviation $\Delta Q$ represents the quantity of additional intake air demanded by the engine E so as to deal with such an additional load. Thus, when the coolant compressor 25 operates as an additional load of the engine E, the air quantity deviation $\Delta Q$ is given by $$\Delta Q = Q_{A/C}$$

where $Q_{A/C}$ represents the additional quantity of air to be added to the quantity of bypass air for compensation so as to deal with the operation of the air conditioner. It is apparent that $\Delta Q = 0$ when the coolant compressor 25 is not under operation.

Step S6

After the air quantity deviation $\Delta Q$ is set in the step S5, the CPU 33 confirms as to whether or not the P/S switch 30 generates its output signal. When an increase in the oil pressure is detected as a result of steering of the handle, the CPU 33 adds a compensation value $Q_{P/S}$ to the air quantity deviation $\Delta Q$ for incrementing the value of $\Delta Q$ due to the operation of the P/S switch 30. Thus, $\Delta Q$ is now expressed as follows:

$$\Delta Q = \Delta Q + Q_{P/S}$$

Step S7

The CPU 33 then confirms as to whether or not the regulator 29 generates its output signal, and, when the alternator 26 starts to generate power, the CPU 33 adds a compensation value $Q_{ALT}$ to the air quantity deviator $\Delta Q$ for incrementing the value of $\Delta Q$ due to the operation of the alternator 26. Thus, Q is now expressed as follows:

$$\Delta Q = \Delta Q + Q_{ALT}$$

In the above expressions, each of the compensation values $Q_{A/C}$, $Q_{P/S}$ and $Q_{ALT}$ represents the air quantity (g/sec) supplied per unit time and is experimentally computed under the condition where the engine E is hot idling and loaded with a single load.

After the air quantity deviation $\Delta Q$ is computed in the manner described above, the CPU 33 makes reference to a map representing the valve opening characteristic as shown in FIG. 7.

Step S8

From the map shown in FIG. 7, the CPU 33 retrieves or reads the basic quantity $Q_{BASE}$ of bypass air flowing through the ISC valve 1 on the basis of the basic valve position $P_{BASE}$ determined already, as indicated by the arrowed symbols ①→② in FIG. 7.

Step S9

The CPU 33 adds the air quantity deviation $\Delta Q$ to this basic flow quantity $Q_{BASE}$ to compute an objective air quantity $Q_{OBJ}$, as indicated by the arrowed symbol ③ in FIG. 7.

Step S10

Finally, from the map shown in FIG. 7, the CPU 33 retrieves or reads an objective valve position $P_{OBJ}$ of the valve member of the ISC valve 1 corresponding to the objective air quantity $Q_{OBJ}$, as indicated by the arrowed symbols 4 →⑤ in FIG. 7.

The objective valve position $P_{OBJ}$ obtained by the above manner of computation can necessarily cancel the air quantity deviation $\Delta Q$ regardless of the value of the basic valve position $P_{BASE}$.

Step S11

The CPU 33 then computes the deviation of the real valve position $P_{OBJ}(t-1)$ from the objective valve position $P_{OBJ}$, that is, the required quantity $\Delta Q$ for driving the valve member of the ISC valve 1 and applies the corresponding driving signal to the stepping motor 106 mounted on the ISC valve 1. The value of $\Delta Q$ is given by $$\Delta Q = P_{OBJ} - P_{OBJ}(t-1)$$

As described already, the real valve position $P_{OBJ}(t-1)$ corresponds to the number of steps of rotor rotation in the stepping motor 106 for actuating the ISC valve 1 from the full closed position, and this real valve position $P_{OBJ}(t-1)$ is stored in the RAM 39 (or the BURAM 41).

Step S12

The CPU 33 then replaces the real valve position $P_{OBJ}(t-1)$ for the objective valve position $P_{OBJ}$, and the new objective valve position $P_{OBJ}$ is now stored in the RAM 39 (or the BURAM 41).

Step S13

On the other hand, when the result of decision made in the step S2 proves that the N-feedback mode is to be selected, the CPU 33 decides as to whether or not the control period set by the time counter (not shown) has elapsed. In the present embodiment, the control period in the N-feedback mode is set at 1 sec, and, as in the case of the P-feedback mode, the control program returns to the start point when the CPU 33 decides that the control period has not yet elapsed.

Step S14

When the CPU 33 decides that the control period has elapsed already, the CPU 33 computes the difference between an objective engine rotation speed $N_{E\ OBJ}$ and the real engine rotation speed $N_{E\ R}$, that is, the engine rotation speed deviation $\Delta N$, as follows:

$$\Delta N = N_{E\ OBJ} - N_{E\ R}$$

the objective engine rotation speed $N_{E\ OBJ}$ is retrieved or read from a known map (not shown) on the basis of the operating condition of the engine E.

Step S15

Figure 8:
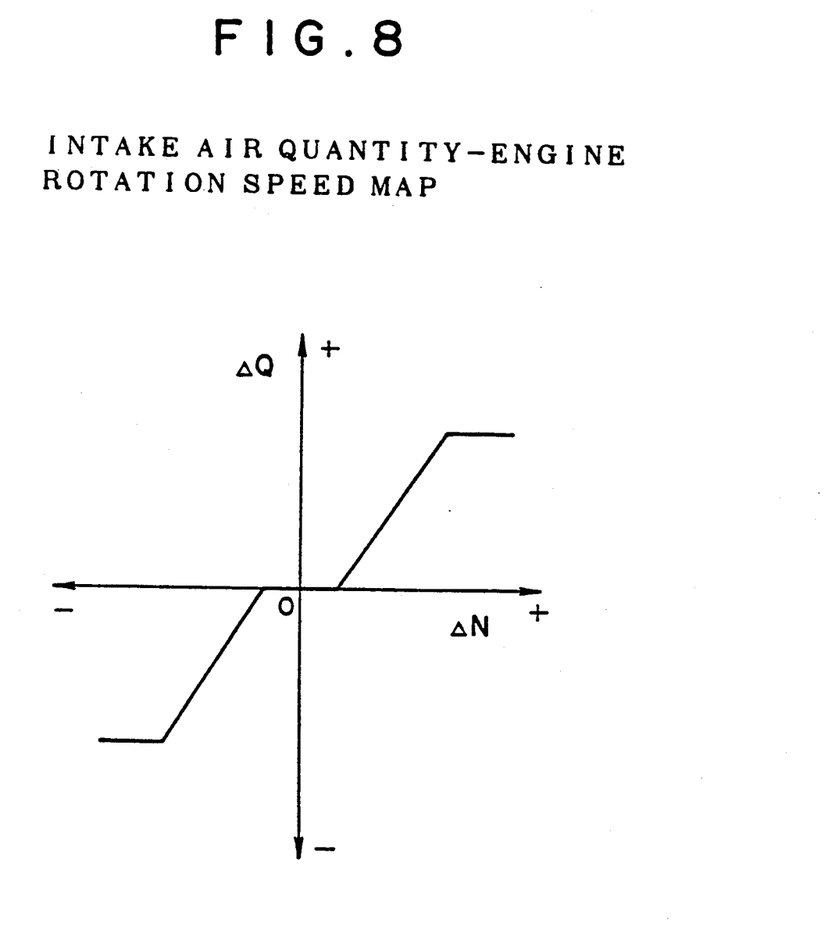
FIG. 8 shows a map representing the relation between the quantity of intake air and the rotation speed of the engine.

After the engine rotation speed deviation $\Delta N$ is computed, the CPU 33 retrieves or reads, from a map representing the relation between the quantity of intake air and the engine rotation speed as shown in FIG. 8, an air quantity increment or decrement, that is, the air quantity deviation $\Delta Q$ required to cancel the engine rotation speed deviation $\Delta N$.

In the map shown in FIG. 8, the air quantity deviation $\Delta Q$ is set at zero in the range where the value of the engine rotation speed deviation $\Delta N$ is small, while an upper limit and lower limit are provided for the air quantity deviation $\Delta Q$. The former intends to prevent hunting, and the latter intends to prevent any abrupt variation of the operating condition of the engine E.

After the air quantity deviation $\Delta Q$ is retrieved or read in the step S15, the CPU 33 makes reference to the valve opening characteristic map shown in FIG. 7, as in the case of the P-feedback mode.

Step S16

From the map shown in FIG. 7, the CPU 33 retrieves or reads the real quantity $Q_{REAL}$ of bypass air flowing through the ISC valve 1, corresponding to the real valve position $P_{OBJ}(t-1)$, as indicated by the arrowed symbols ①→② in FIG. 7.

Step 17

The CPU 33 then adds the air quantity deviation $\Delta Q$ to this real air quantity $Q_{REAL}$ to compute the objective air quantity $Q_{OBJ}$, as indicated by the arrowed symbol ③ in FIG. 7.

Step S18

Finally, from the map shown in FIG. 7, the CPU 33 retrieves or reads the objective valve position $P_{OBJ}$ of the valve member of the ISC valve 1 corresponding to the objective air quantity $Q_{OBJ}$, as indicated by the arrowed symbols ④→⑤ in FIG. 7.

After the step S18, the CPU 33 executes the aforementioned control steps S11 and S12 in which the CPU 33 applies the driving signal to the stepping motor 106 mounted on the ISC valve 1 and updates and stores the real valve position $P_{OBJ}(t-1)$ in the RAM 39 (or the BURAM 41).

Second Embodiment

The operation of the second embodiment of the method according to the present invention will now be described with reference to FIG. 5 which is a flow chart of control steps and FIGS. 9, 10 and 11 which show various control maps.

Figure 5:
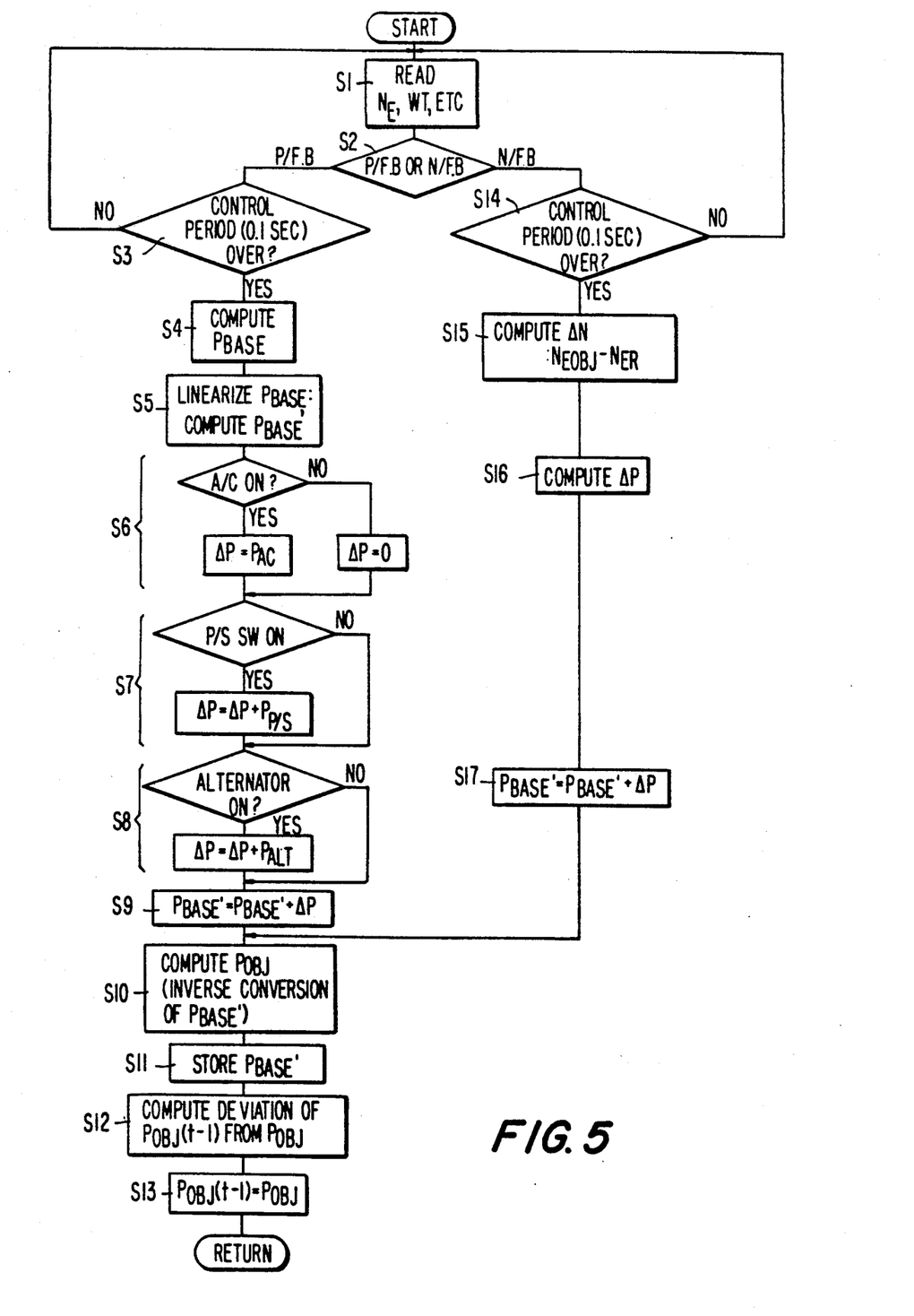
FIG. 5 is a flow chart of control steps according to the second embodiment of the present invention.

When the output signal from the idle switch 12 is applied to the CPU 33 after the engine E is started from its standstill state, the CPU 33 confirms the fact that the engine E is now idling and controls the ISC valve 1 according to the flow chart shown in FIG. 5.

Step S1

As soon as the ISC control is started, the CPU 33 reads various engine operation parameter information including the engine rotation speed information $N_E$ transmitted from the crank angle sensor 20 and the cooling water temperature information WT transmitted from the water temperature sensor 31.

Step S2

Then, on the basis of these engine operation parameter information, the CPU 33 decides as to whether the P-feedback mode or the N-feedback mode is to be selected for the ISC control. As in the case of the first embodiment, this decision is made on the basis of the engine operation parameter information. Thus, when the engine E is hot idling and its operating condition is stabilized, the N-feedback mode is selected, while, in any one of other cases, the P-feedback mode is selected.

Step S3

When the P-feedback mode is selected, the CPU 33 decides as to whether or not a period of control set by a time counter (not shown) has elapsed. In this second embodiment too, the control period in the P-feedback mode is set at 0.1 sec. When the CPU 33 decides that the control period has not yet elapsed, the control program returns to the start point.

Step S4

When the CPU 33 decides that the control period has elapsed already, the CPU 33 retrieves or reads the basic valve position $P_{BASE}$ of the ISC valve 1 from the map representing the relation between the basic valve position $P_{BASE}$ and the cooling water temperature WT and stored in the ROM 38. This map is shown in FIG. 6.

Step S5

Figure 9:
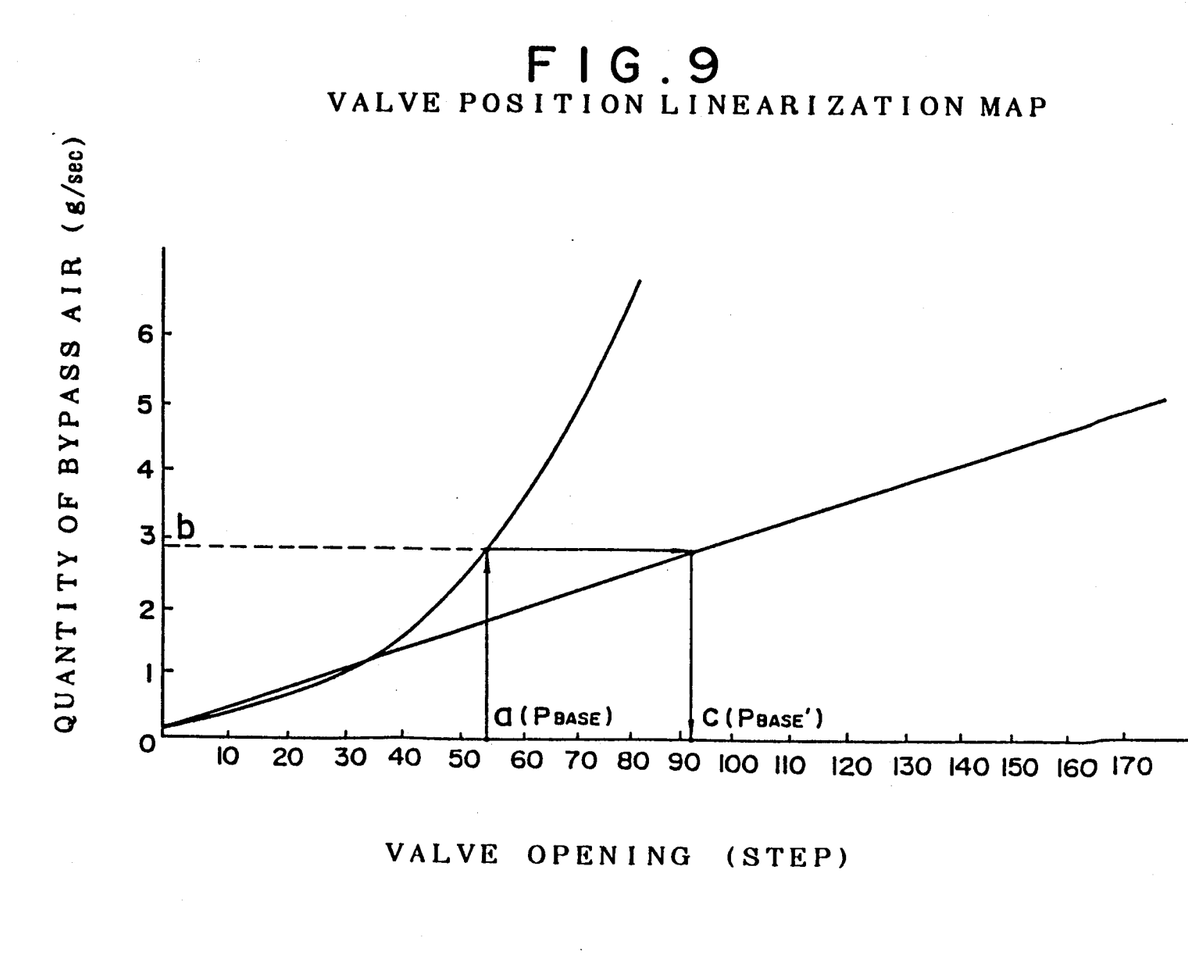
FIG. 9 shows a valve position linearizing map.

After the basic valve position $P_{BASE}$ is set in the step S4, the CPU 33 makes reference to a valve position linearization map shown in FIG. 9 so as to linearize the basic valve position $P_{BASE}$. This valve position linearization map is prepared so that the basic valve position $P_{BASE}$ is converted into a virtual valve position $P_{BASE'}$ which is proportional to the quantity of intake air flow. This valve position linearization map is such that a conversion factor L shown by a broken line is additionally provided in the valve opening characteristic map shown in FIG. 7. In this second embodiment, the gradient of the conversion factor line L is selected to be approximately equal to the valve opening ratio of the ISC valve 1 in the hot idling condition of the engine E. Therefore, the value of the virtual valve position $P_{BASE'}$, when the ISC valve 1 is full opened, is two or more times as large as that of the basic valve position $P_{BASE}$. Thus, when the basic valve position $P_{BASE}$ in FIG. 9 is represented by a steps, and the corresponding quantity of air flow is b g/sec, the virtual valve position $P_{BASE'}$ is represented by c steps.

Step S6

After the virtual valve position $P_{BASE'}$ is determined in the step S5, the CPU 33 confirms as to whether or not the cooler relay 28 generates its output signal, and, when the operation of the coolant relay 28 is confirmed, the CPU 33 sets a compensation value $\Delta P$ (referred to hereinafter a valve position deviation) required for compensating the valve position to deal with the operation of the coolant compressor 25. This valve position deviation $\Delta P$ represents the number of steps of rotor rotation in the stepping motor 106 driving the valve member of the ISC valve 1 so as to increment the quantity of bypass air demanded by the engine E to deal with such an additional load and corresponds to the air quantity deviation $\Delta Q$ in the first embodiment. Thus, when the coolant compressor 25 operates as an additional load on the engine E, the valve position deviation $\Delta P$ is given by $$\Delta P = P_{A/C}$$

where $P_{A/C}$ represents the value for compensating the valve position to deal with the operation of the air conditioner. It is apparent that $\Delta P = 0$ when the coolant compressor 25 is not under operation.

Step S7

After the valve position deviation $\Delta P$ is set in the step S6, the CPU 33 confirms as to whether or not the P/S switch 30 generates its output signal. When an increase in the oil pressure is detected as a result of steering of the handle, the CPU 33 adds a compensation value $P_{P/S}$ to the valve position deviation $\Delta P$ for incrementing the value of $\Delta P$ due to the operation of the oil pump 27. Thus, $\Delta P$ is now expressed as follows:

$$\Delta P = \Delta P + P_{P/S}$$

Step S8

The CPU 33 then confirms as to whether or not the regulator 29 generates its output signal, and, when the alternator 26 starts to generate power, the CPU adds a compensation value $P_{ALT}$ to the valve position deviation $\Delta P$ for incrementing the value of P due to the operation of the alternator 26. Thus, $\Delta P$ is now expressed as follows:

$$\Delta P = \Delta P + P_{ALT}$$

In the above expressions, each of the compensation values $P_{A/C}$, $P_{P/S}$ and $P_{ALT}$ represents the number of steps of rotor rotation in the stepping motor 106 driving the valve member of the ISC valve 1 and is experimentally computed under the condition where the engine E is hot idling and is loaded with a single load.

Step S9

After the computation of the valve position deviation ΔP in the manner described above, the CPU 33 adds the valve position deviation ΔP to the virtual valve position $P_{BASE}$ as follows:

$$P_{BASE} = P_{BASE} + \Delta P$$

Step S10

Figure 10:
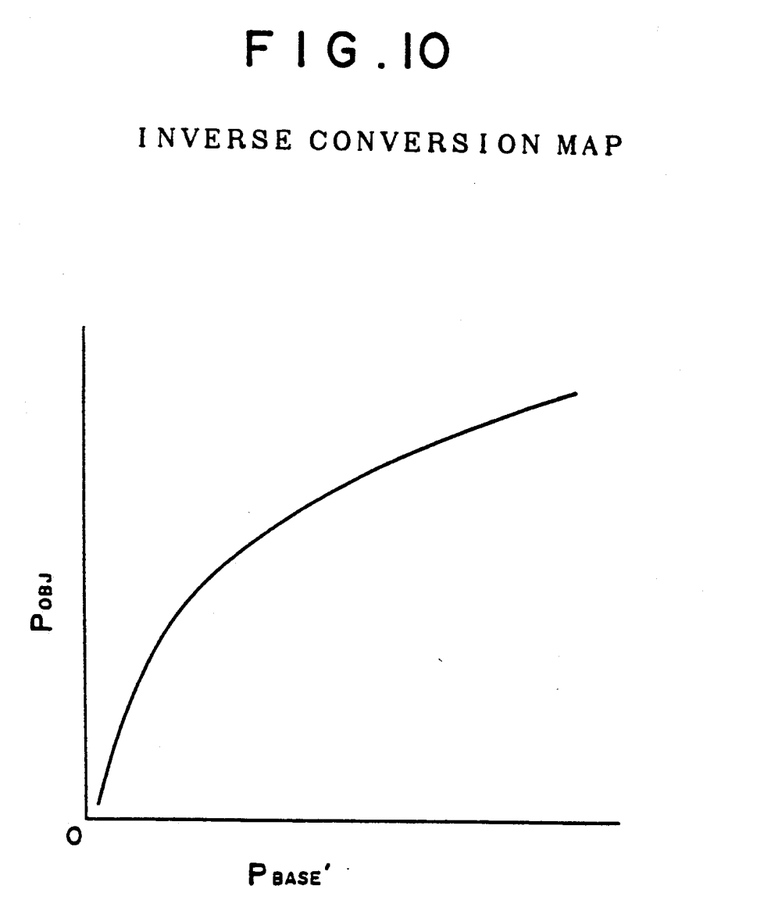
FIG. 10 shows an inverse conversion map.

The CPU 33 then makes reference to an inverse conversion map shown in FIG. 10 so as to retrieve or read an objective valve position $P_{OBJ}$ corresponding to the virtual valve position $P_{BASE}$. This inverse conversion map shown in FIG. 10 is inverse to the valve position linearization map shown in FIG. 9 in that the virtual valve position $P_{BASE}$ is based to find the corresponding objective valve position $P_{OBJ}$. Thus, the real valve position, that is, the objective valve position $P_{OBJ}$ corresponding to the quantity of air flow based on the virtual valve position $P_{BASE}$ is retrieved or read from the map shown in FIG. 10.

Step S11

The virtual valve position $P_{BASE}$ is stored in the RAM 39 under control of the CPU 33. This virtual valve position $P_{BASE}$ stored in the RAM 39 is used in the N-feedback mode described later.

Step S12

Then, as in the case of the first embodiment, the CPU 33 computes the deviation of the real valve position $P_{OBJ}(t-1)$ from the objective valve position $P_{OBJ}$, that is, the required quantity ΔP for driving the valve member of the ISC valve 1 and applies the corresponding driving signal to the stepping motor 106 mounted on the ISC valve 1. The value of ΔP is given by $$\Delta P = P_{OBJ} - P_{OBJ}(t-1)$$

Step S13

The CPU 33 then replaces the real valve position $P_{OBJ}(t-1)$ for the objective valve position $P_{OBJ}$, and the new objective valve position $P_{OBJ}$ is now stored in the RAM 39 (or the BURAM 41).

Step S14

On the other hand, when the result of decision made in the step S2 proves that the N-feedback made is to be selected, the CPU 33 decides as to whether or not the control period set by the time counter (not shown) has elapsed. In this second embodiment, the control period in the N-feedback mode is set at 1 sec, as in the case of the first embodiment. The control program returns to the start point when the CPU 33 decides that the control period has not yet elapsed.

Step S15

When the CPU 33 decides that the control period has elapsed already, the CPU 33 computes the difference between the objective engine rotation speed $N_{E\ OBJ}$ and the real engine rotation speed $N_{E\ R}$, that is, the engine rotation speed deviation N, as follows:

$$\Delta N = N_{E\ OBJ} - N_{E\ R}$$

Step S16

Figure 11:
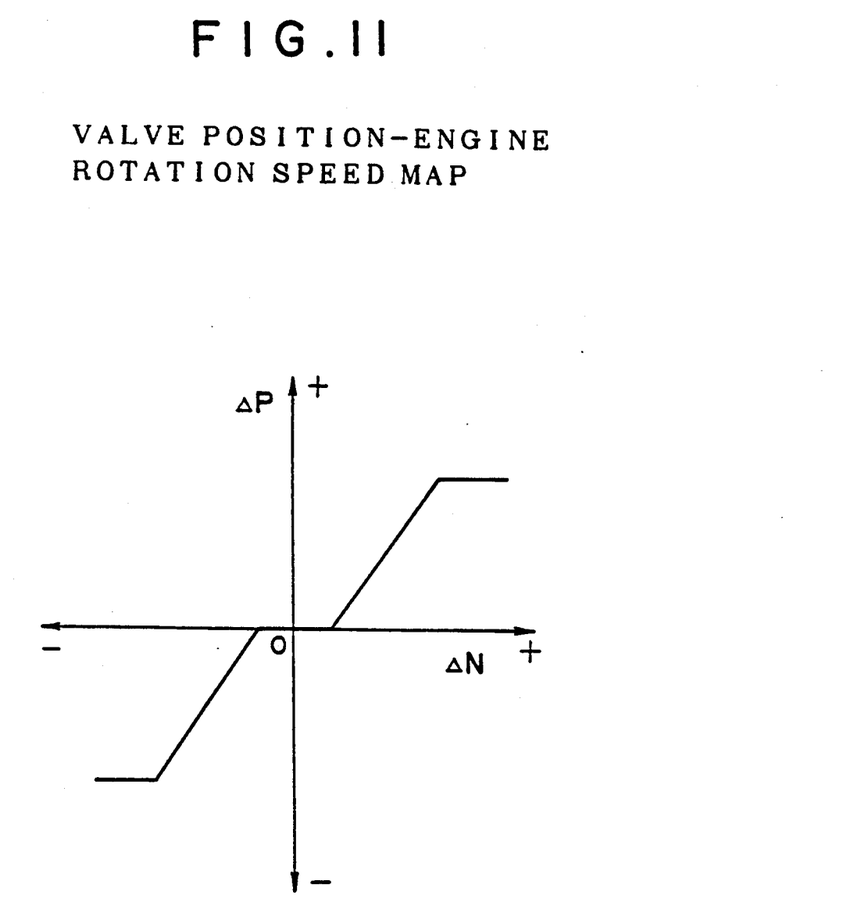
FIG. 11 shows a map representing the relation between the valve position and the engine rotation speed.

After the engine rotation speed deviation ΔN is computed, the CPU 33 retrieves or reads, from a map representing the relation between the valve position and the engine rotation speed as shown in FIG. 11, a valve position increment or decrement, that is, the valve position deviation ΔP required to cancel the engine rotation speed deviation ΔN.

For the same purpose as that of the air quantity-engine rotation speed map used in the first embodiment, the valve position deviation ΔP in the map shown in FIG. 11 is set at zero in the range where the value of the engine rotation speed deviation ΔN is small, while an upper limit and lower limit are provided for the valve position deviation ΔP.

Step S17

After the valve position deviation ΔP is retrieved or read in the step S16, the CPU 33 adds the valve position deviation P to the virtual valve position $P_{BASE}$ stored previously in the RAM 39 in the step S11. Thus, the virtual valve position $P_{BASE}$ is now expressed as follows:

$$P_{BASE} = P_{BASE} + \Delta P$$

In this case, the virtual valve position $P_{BASE}$ may be computed by the use of the valve position linearization map shown in FIG. 8.

After the step S17, the CPU 33 executes the aforementioned control steps S10 to S13 in which the CPU 33 applies the driving signal to the stepping motor 106 mounted on the ISC valve 1 and updates and stores the real valve position $P_{OBJ}(t-1)$ in the RAM 39 (or the BURAM 41).

It will be understood from the foregoing description of two embodiments of the method of the present invention that the valve position of the flow control valve (the ISC valve) having the non-linear valve opening characteristic is converted into a corresponding intake air quantity or a virtual valve position, so that the flow control valve can be controlled as if it has a linear valve opening characteristic, and the accuracy of control can be greatly improved.

The present invention is in no way limited to such specific embodiments and is equally effectively applicable to, for example, the ISC control in an air intake system including a fast-idling purpose independent wax valve besides the ISC valve. Further, although only three auxiliary units are considered as loads on the engine, an additional auxiliary unit such as an air compressor may also be taken into account as another load on the engine. Further, in addition to the ISC control, the present invention may be applied to another manner of intake air quantity control such as throttle valve open-close control. Furthermore, in lieu of the virtual valve position of the flow control valve referred to in the second embodiment, another factor proportional to the quantity of intake air flow may be employed for the purpose of the ISC control.

What is claimed is:

1. A method for controlling an internal combustion engine provided with a flow control valve which has a non-linear characteristic between the quantity of intake air flowing therethrough and the position of its valve member when the flow control valve is in its open position, and for controlling the quantity of intake air supplied to the engine by actuating the flow control valve by an actuator, said method comprising:
- a first step of converting the position of the valve member of said flow control valve under a predetermined operating condition of said engine into a quantity of intake air determined according to said non-linear characteristic of said flow control valve;
- a second step of adding, to said quantity of intake air computed as a result of the conversion according to said non-linear characteristic, a pre-set intake air quantity change previously determined to deal with a change in the operating condition of the engine thereby computing an objective quantity of intake air;
- a third step of converting said objective quantity of intake air into an objective position of the valve member of said flow control valve according to said non-linear characteristic; and
- a fourth step of actuating said flow control valve by said actuator on the basis of a deviation of the real position of the valve member of said flow control valve from the objective position of the valve member of said flow control valve.

2. A method according to claim 1, wherein said operating condition of said internal combustion engine changes depending on at least a variation of a load imposed on said engine.

3. A method according to claim 1, wherein said operating condition of said internal combustion engine changes depending on at least a variation of the rotation speed of said engine.

4. A method for controlling an internal combustion engine provided with a flow control valve which has a non-linear characteristic between the quantity of intake air flowing therethrough and the position of its valve member when the flow control valve is in its open position, and for controlling the quantity of intake air supplied to the engine by actuating the flow control valve by an actuator, said method comprising:
- a first step of converting the position of the valve member of said flow control valve under a predetermined operating condition of said engine into a virtual valve position having a linear characteristic with respect to the quantity of intake air flowing through said flow control valve having the non-linear characteristic;
- a second step of adding, to said virtual position of the valve member of said flow control valve, a pre-set valve member displacement previously determined to deal with a change in the operating condition of said engine thereby computing a virtual objective position of the valve member of said flow control valve;
- a third step of inversely converting said virtual objective position of the valve member of said flow control valve into an objective position of the valve member of said flow control valve according to an inverse conversion map; and
- a fourth step of actuating said flow control valve by said actuator on the basis of a deviation of the real position of the valve member of said flow control valve from the objective position of the valve member of said flow control valve.

5. A method according to claim 4, wherein said operating condition of said internal combustion engine changes depending on at least a variation of a load imposed on said engine.

6. A method according to claim 4, wherein said operating condition of said internal combustion engine changes depending on at least a variation of the rotation speed of said engine.

7. A method according to claim 1, wherein said operating condition of said internal combustion engine indicates an idling condition of said engine.

8. A method according to claim 4, wherein said operating condition of said internal combustion engine indicates an idling condition of said engine.

* * * * *